United States Patent

Schulz et al.

[11] Patent Number: 5,910,066
[45] Date of Patent: Jun. 8, 1999

[54] PLANETARY GEAR

[75] Inventors: Horst Schulz, Friedrichshafen; Bernd Somschor, Tettnang, both of Germany

[73] Assignee: ZF Friedrichshafen AG, Friedrichshafen, Germany

[21] Appl. No.: 08/894,572
[22] PCT Filed: Mar. 19, 1996
[86] PCT No.: PCT/EP96/01170
 § 371 Date: Aug. 22, 1997
 § 102(e) Date: Aug. 22, 1997
[87] PCT Pub. No.: WO96/29526
 PCT Pub. Date: Sep. 26, 1996

[30] Foreign Application Priority Data

Mar. 23, 1995 [DE] Germany ............................ 195 10 499

[51] Int. Cl.⁶ ........................................................ F16H 1/36
[52] U.S. Cl. ........................... 475/336; 475/338; 475/331
[58] Field of Search ....................................... 475/336, 331, 475/344, 346, 338, 341

[56] References Cited

U.S. PATENT DOCUMENTS

| 1,499,763 | 7/1924 | Davis . | |
| 4,043,226 | 8/1977 | Buuck | 475/331 X |
| 4,106,366 | 8/1978 | Altenbokum et al. . | |
| 4,280,376 | 7/1981 | Rosen | 475/344 X |
| 5,242,336 | 9/1993 | Hori . | |
| 5,295,922 | 3/1994 | Amborn et al. | 475/346 X |
| 5,385,514 | 1/1995 | Dawe | 475/336 |
| 5,409,430 | 4/1995 | Hashimoto et al. | 475/331 |
| 5,472,387 | 12/1995 | Kamlukin | 475/346 X |

FOREIGN PATENT DOCUMENTS

| 0 627 575 | 12/1994 | European Pat. Off. . |
| 1073194 | 9/1954 | France . |
| 257825 | 4/1949 | Switzerland . |
| WO 95/04232 | 2/1995 | WIPO . |

Primary Examiner—Dirk Wright
Assistant Examiner—Peter T. Kwon
Attorney, Agent, or Firm—Davis and Bujold

[57] ABSTRACT

A planetary gear having step planet gears is generically a Wolfrom gear which permits large ratios. Transmission of this type are used mainly in the handling technology. In order to improve the portability, friction, vibration and noise characteristics, step planet gears with separate toothed regions of the step gears are used. The modules of the step gears are graduated. The number of teeth is identical. Each of the teeth engagements with the ring gears can be optimized. The teeth on the step gears are preferably honed.

14 Claims, 3 Drawing Sheets

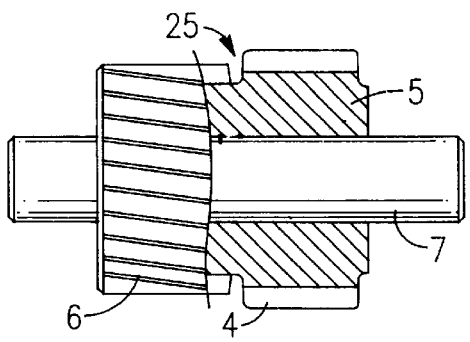
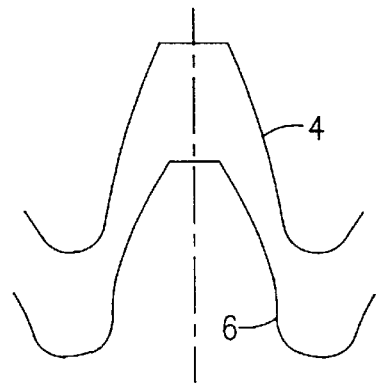
FIG.3  FIG.4
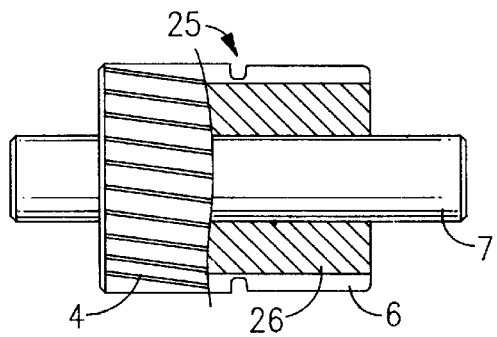
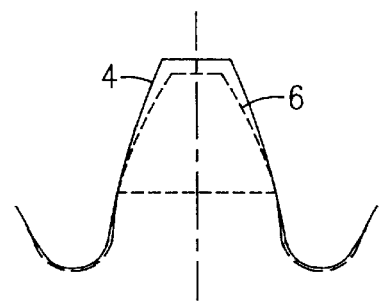
FIG.5  FIG.6
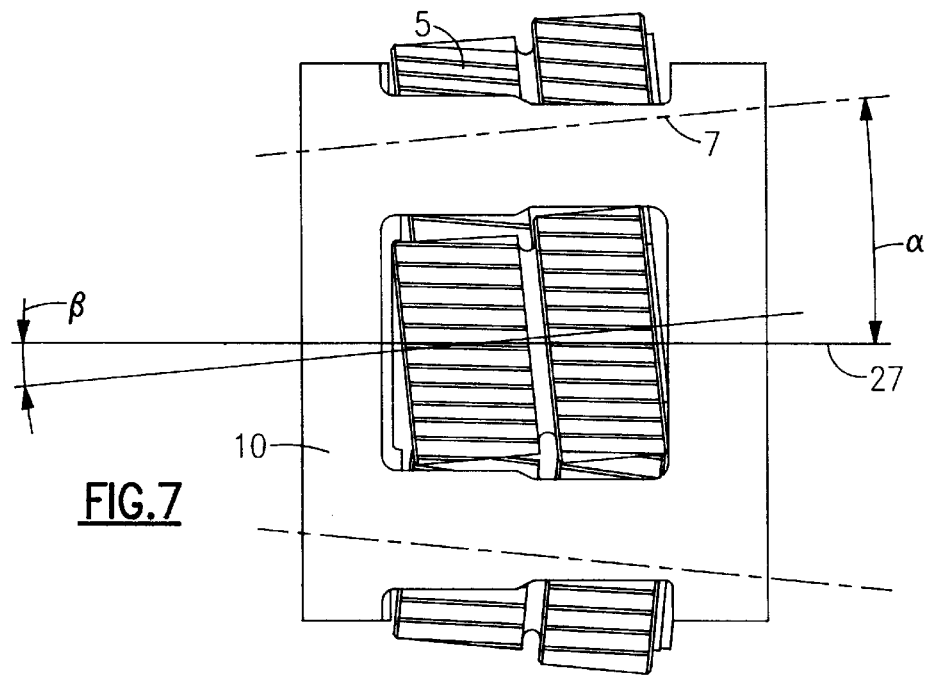
FIG.7

PLANETARY GEAR

The invention concerns a planetary gear having one driven sun gear and two internally toothed ring gears, one of which is mounted stationarily and the other rotatably forming the output. There have been several planetary gears devised which are supported upon planetary axles in a planetary carrier. The planetary gears are in constant tooth meshing contact with the sun gear and the ring gears.

Many problem scenarios in the driving technology require the realization of extreme ratios. Planetary gears are especially well suited for combining high ratios with a compact design. The Wolfrom coupling gear, which has a high ratio, still has good efficiency and constitutes such a planetary gear. The Wolfrom gear is designated a special simple coupling gear. The input is connected with a sun gear which interacts with a planetary gear block. The planetary gear supports itself on the internally toothed ring gear which is firmly attached to the housing. The web rotates along idly as a planetary carrier. The movement is passed on via the planetary carrier and the planetary gear(s) (step planet). The planetary gear meshes with an internally toothed ring gear which forms the output. The arrangement described is adequate for a compact design which in a narrow space allows high transmission densities (see Klein: Theoretische Grundlagen zum Auslegen von Wolfrom-Koppel-getrieben, in Maschinenmarkt 1982, pages 341 to 344).

Particularly, in the handling technology, high gear reduction transmissions are needed for power transmission in high-speed engines. Said transmissions must have a small amount of rotary play during a change in load direction. They must also have an anti-torsional, light and compact design.

In planetary gears of the kind in question, the total efficiency is another decisive criterion for determining their usefulness. Internal stresses, for example, have a negative influence on the total efficiency due to the elevated inner rubbing power that results.

U.S. Pat. No. 4,106,366 has disclosed a planetary gear wherein an internally toothed ring gear is pressed by coil compression springs upon the conically formed planetary gears. On account of the high tooth rubbing power due to inner stresses, the total efficiency is here inadmissibly reduced.

A planetary transmission with planet gears, which have piercing straight-cut teeth, has also been disclosed in U.S. Pat. No. 5,242,336. Said transmission has the disadvantage that a relatively large, contact-free, axial intermediate space is needed between both ring gears in order to compensate for the relatively great difference in the numbers of teeth of both ring gears without extreme distortions of the contact ratios. Said axial intermediate space naturally increases the axial length of the transmission and reduces the rigidity thereof. Of considerable disadvantage is the increase in drag torque, since the planets and the planet carrier become heavier due to said intermediate space. The dynamic properties of this drive are impaired by this configuration, especially when the planet gears and the planet carrier rotate at high speeds. When it is desired to omit said axial intermediate space, then considerable distortions of the contact ratios would be inevitable. Extreme values in the addendum modification coefficient of the ring gears result in sharp tooth gaps in the ring gears, which also act unfavorably upon the tooth-cutting tools. Extreme values in the pressure angles would lead to problems in noise, friction, torque and wear.

From European patent application 0 627 575 a Wolfrom planetary gear is defined wherein the planet gears are disposed axially in two differently toothed regions. The pitch diameters of both toothed regions can be equal or unequal. The axial forces appearing in both regions must be substantially removed head-on by opposing helical-cut teeth. Examining the tooth forces that appear, it is found that the occurring axial forces do not reciprocally cancel each other, but add up to a resultant.

In the planetary gear, according to international patent application WO 95/04232, the planetary gears also have piercing teeth. The advantage of said arrangement consists in that the ring gears can be disposed directly consecutively in an axial direction. This ensures high rigidity of the gear although the difference in the numbers of teeth of both ring gears must be small. Due to teeth with an absolutely constant spline of the tooth flanks on the planets, compromises must be made in the reciprocal adaptation of the teeth of both ring gears.

Finally, U.S. Pat. No. 1,499,763 defines a transmission in which the ratio attainable has to be extraordinarily great. It is proposed to provide the planets with two pinions having equal pitch diameters, different numbers of teeth and different modules. The proposed design of the planets results in distorted contact ratios so that said transmission has very poor efficiency. Accordingly, the field of use is significantly limited.

Departing from the above explained prior art, the problem on which the invention is based is to design a planetary gear in a manner such that the planets have toothed regions to be separately optimized which are designed so as to prevent distortions in the toothing geometry.

The advantages that can be obtained by the invention consist, in particular, in that both ring gears can be disposed directly consecutively in an axial direction. Since the partial toothings are not identical, the respective tooth meshings can be separately optimized. This means that the pressure angles have normal values. The configuration of the toothed regions of the planets with different modules, and thus different base circles in both toothed regions, permits extensive compensations of the influence in the different numbers of teeth in both ring gears. On one hand, it is truly possible to arrange the ring gears axially tightly compressed but, on the other hand, only relatively small distortions result in the geometry of the toothing. The conditions are thus provided for keeping equally low the friction torque, the vibrations and the development of noise and to achieve a maximum in portability. In spite of the different toothed regions in the base circles of the involute, the assembly conditions remain simple. The modules are graduatedly selected in such a manner that approximately equal pressure angles—as seen in an axial direction—appear in the respective centers of both ring gears. It is advantageous if the step planets have helical-cut teeth. The helical-cut teeth must preferably have the same sense of direction and substantially the same pitch measure.

Other features essential to the invention and the advantages resulting therefrom are to be understood from the description that follows of two embodiments of a play-free planetary gear. In the drawings:

FIG. 3 is a step planet, as used in the planet gear of FIG. 1, seen in a partly cut away sideview;

FIG. 4 is a representation of the tooth shapes of the step planets of FIG. 3;

FIG. 5 is a step planet, as used in the planet gear of FIG. 2, seen in a partly cut away sideview;

FIG. 6 is a representation of the tooth shapes of the step planets of FIG. 5; and FIG. 7 is a partial view of the planetary gear according to FIG. 1 which reproduces the spatial position of the step planets.

Figure 1:
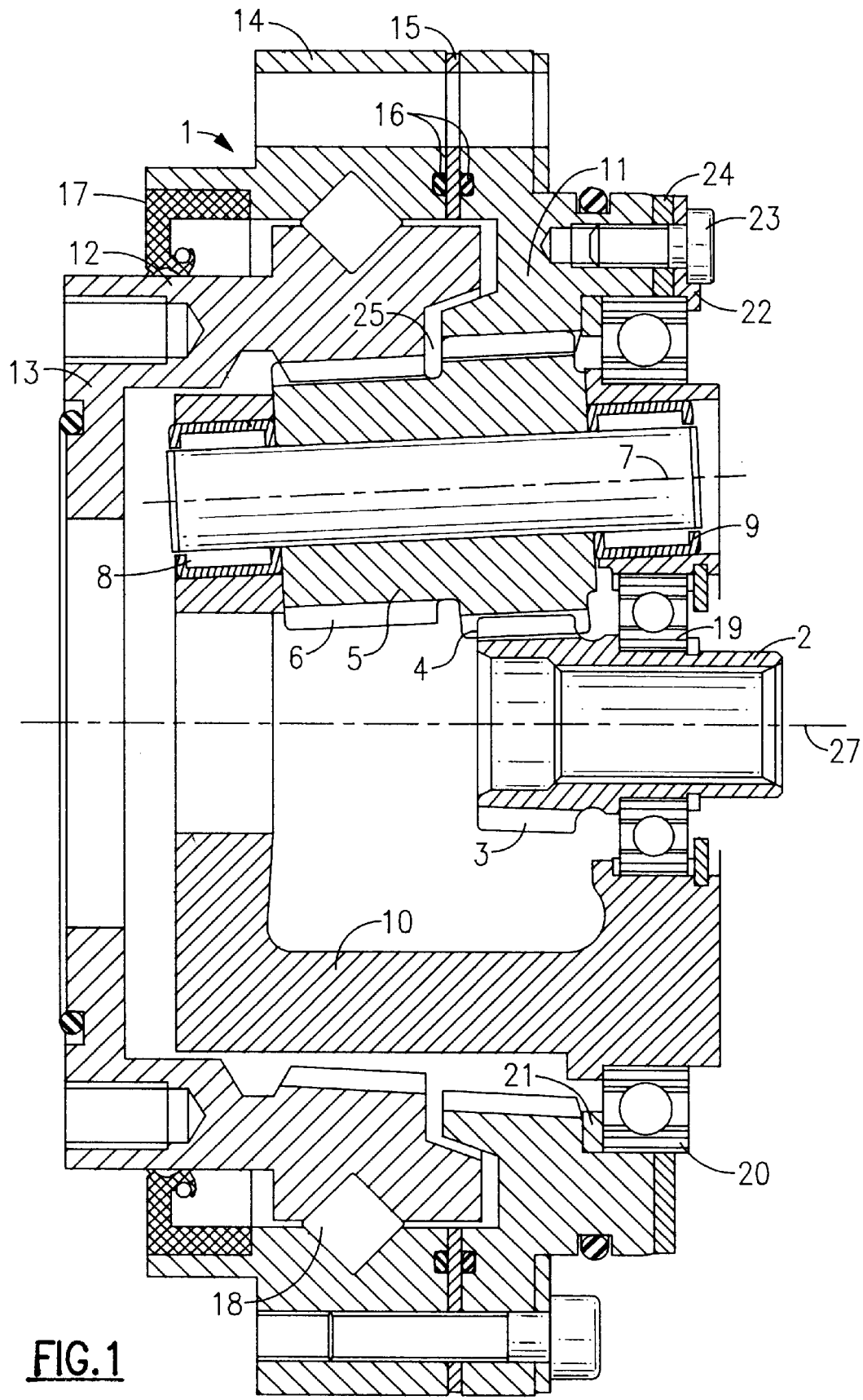
FIG. 1 is a first embodiment of a planetary gear in longitudinal section with step planets and conically toothed ring gears.

In the planetary gear, shown in longitudinal section in FIG. 1, an input shaft 2 rotating at high speed drives a sun gear 3 (small central gear). In the instant case, the sun gear 3 and the input shaft 2 are made as one piece.

The sun gear 3 is in constant meshing contact with several large step gears 4 of a step planet 5. Each step planet 5 is completed by a small step gear 6. One of the step planets 5 is reproduced in the drawing. A total of four step planets 5 are provided.

An axle 7 is rotatably supported in a planet carrier 10 by bearings 8 and 9, preferably needle bearings. Each step planet 5 is non-rotatably connected with its axle 7 and fixed in an axial direction, for example, by an adequate fitting connection. The large step gears 4 of the step planets 5 are in constant meshing contact with a first ring gear 11. They are simultaneously in constant engagement with a second ring gear 12 via the small step gears 6.

The planet carrier 10 has no direct connecting shafts so that no torque is supplied or removed. It accordingly rotates idly.

The first ring gear 11 is fixedly situated while the second ring gear 12 is firmly connected with an output flange 13. From the drawing, it can be seen that the second ring gear and the output flange 13 are made as one piece.

An annular housing 14 is firmly connected with the first ring gear 11 by fastening elements. A screw connection, for example, is adequate for this. A spacer disc 15 is inserted between the connecting faces of the first ring gear 11 and of the annular housing 14. Provision is also made, by adequate seals such as O-rings 16, for a tight connection between the spacer disc 15 and the first ring gear 11 as well as the annular housing 14.

To protect the planetary gear 1 against external influences, a seal, preferably a radial corrugated seal ring 17, is inserted between the housing 14 and the output flange 13.

The second ring gear 12, and therewith the output flange 13, are rotatably and fixedly supported in the annular housing 14, in an axial direction, by a single anti-friction bearing preferably designed as cross roller bearing 18. Instead of the cross roller bearing, other designs are available to one skilled in the art. The second ring gear 12 and the output flange 13 could, for example, be supported by the annular housing 14 via respective grooved ball bearings.

It has already been mentioned previously that the planet carrier 10 has no direct connecting shafts and accordingly rotates along idly. For this purpose, the planet carrier 10 is complementarily supported on the input shaft 2 by a ball bearing 19. In substantially the same vertical plane lies another ball bearing 20 by which the planet carrier 10 is supported by the first ring gear 11. As seen in the axial direction, a spacer disc 21 is inserted between the ball bearing 20 and the first ring gear 11. The ball bearing 20 is secured to the first ring gear 11 by a stop ring 22 with the aid of fixing bolts of which one fixing bolt 23 is shown. Another spacer disc 24 is inserted between the annular front face 23, lying to the right in the drawing, of the first ring gear 11 and the stop ring 22.

The input shaft 2 of the sun gear 3 is driven at high speed with relatively low torque. The output flange 13 (which can be connected with an output shaft, itself not shown) rotates at low speed with high torque. The transmission can be used in general where an anti-torsion, light and compact design with a high ratio is needed. A possible field of use is, for example, the handling technology.

Said gearwheels can have the following numbers of teeth:

sun gear 3: 18 teeth;
large step gear 4 and small step gear 6: 26 teeth each;
first ring gear 11 (stator): 74 teeth; and
second ring gear 12 (output): 70 teeth.

The large step gear 4 and the small step gear 6 have the same number of teeth, but the modules are different. The module of the large step wheel, for example, can amount to m=1.98 and that of the small step wheel to m=1.225. Different base circles for producing the involutes result from the different modules. The pitch and base circles of the teeth of the large and small step gears are thereby graduated.

As already mentioned, the teeth of the large step gear 4 and of the first ring gear 11, and those of the small step gear 6 and of the second ring gear 12, intermesh. In order to achieve the high ratio, the ring gears 11, 12 have a different numbers of teeth. In the instant case, the difference is four teeth. With the modules of different size, and the base circles of the large and small step gears 4, 6 differ from each other, an extensive compensation of the difference between the number of teeth of both ring gears is possible. Only very slight distortions appear in the geometry of the toothing even though the first ring gear 11 is separated from the second ring gear 12 by only a small axial gap 25.

Since the step planet is in tooth meshing with the ring gears practically over its whole axial length, a torsion-proof design results.

By the directly consecutively arrangement of the ring gears, in an axial direction, and the extensive compensation of the difference in tooth number of both ring gears, and the use of different modules, favorable load conditions with very small distortions in the geometry of the toothing results. Thus, optimal conditions for uniformly obtaining several objectives are:

the portability is increased;
the friction torques are minimized;
noises and vibrations are reduced; and
the assembly is simplified.

The graduated modules were selected so that in the respective centers of both ring gears 11, 12—referred to the toothing width thereof—almost equal pressure angles result. To prevent fluctuations in efficiency and improve the vibration and noise behavior, it has proved very advantageous to design the teeth of the large and small step gears as helical-cut teeth. Hereby the transmission becomes insensitive to axial play of the step planets 5 when the helical-cut teeth have the same sense of direction and substantially the same pitch dimensions.

In FIG. 3, a step planet 5 is reproduced in a partly cut away sideview. The helical-cut teeth of the small and large step gears 6, 4 are offset from each other by a gap which substantially corresponds to the axial gap 25.

In FIG. 4—on the bottom—the tooth shape of the helical-cut teeth of the small step gear 6 is indicated while—on the top—the tooth shape of the helical-cut teeth of the large step gear 4 is shown. The number of teeth is the same for both gears. With the same number of teeth, considerably simpler assembly cycles result since it is not necessary that a certain tooth be mounted on the step planet in a certain tooth gap of a ring gear.

Even in the production of the teeth of the step gears no specific coordination of position has to be taken into account as long as the coordination of position incidentally produced in the adjustment of the machine tool remains the same for all step planets of a transmission. As a result, the production and assembly costs are reduced.

Special advantages for the rigidity of the transmission result when the positions of the teeth of the small and large step gears 6, 4 of the step planets 5 are identically selected. The axial gap 25 between the toothed regions of the small and large step gears, on account of the small difference of the pitch diameter, is not associated with any disadvantages for the rigidity of the transmission system. Said axial gap 25 serves only to offset the two toothed regions from each other. In this sense, said axial gap does not have the effect of a deep rigidity-lessening groove between the toothed regions of the step planet.

Figure 2:
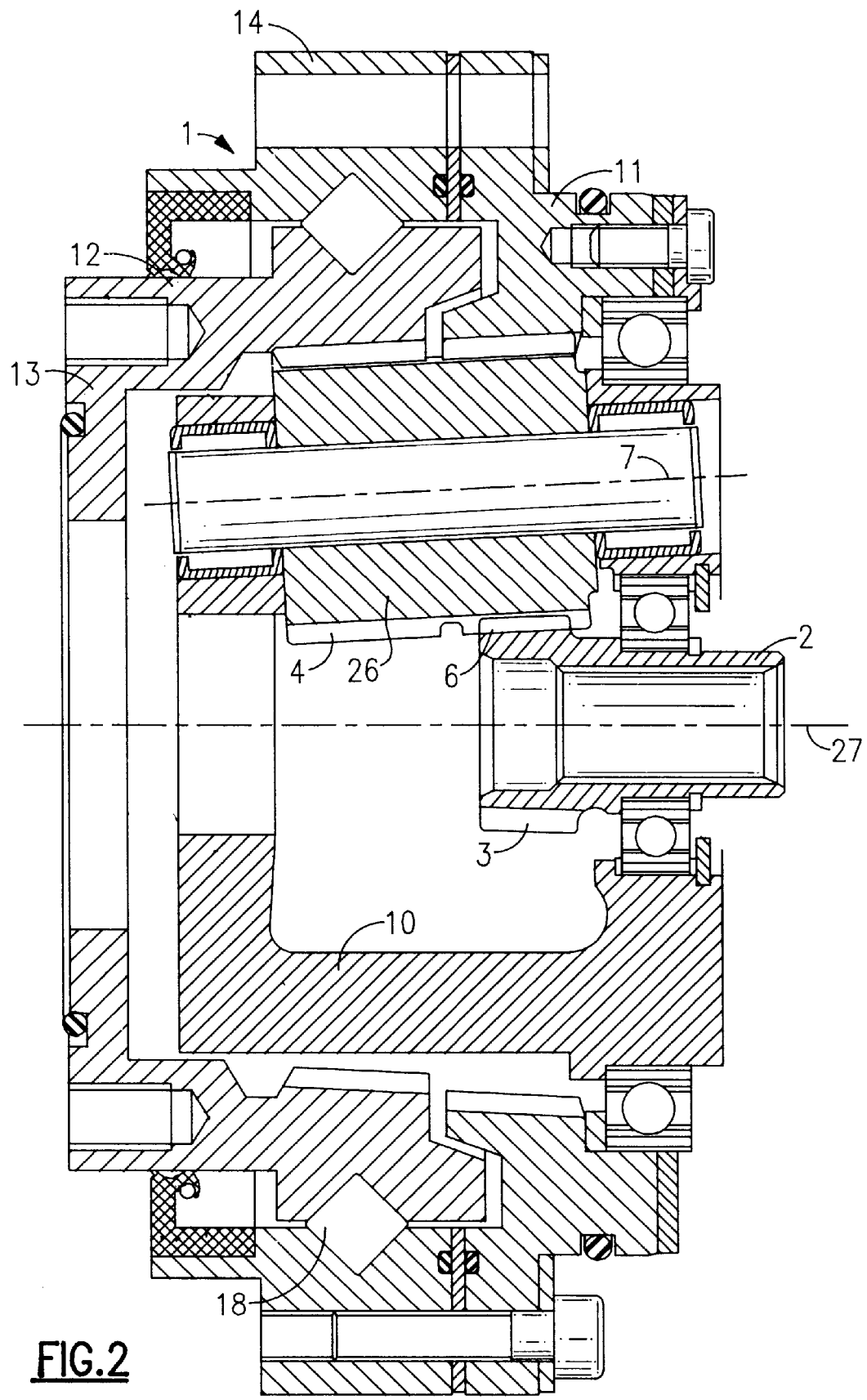
FIG. 2 is a modified embodiment of a planetary gear with modified step planets.

What has been said above is clarified when examining the embodiment of a planetary gear according to FIG. 2. Said planetary gear coincides basically with the design of the one according to FIG. 1. The differences exist in the configuration of the step planet 26, especially regarding the configuration of the toothed regions. The sun gear has a number of teeth of z=22. The number of teeth of the ring gears and of the step gears 6 and 4 coincide with those of the planetary gear of FIG. 1.

In the step planet 26, which is reproduced in FIG. 5 in a partly cut away sideview, the ratios have reversed insofar as the large step gear 4 now lies to the left, based on the drawing, and is in tooth meshing with the second ring gear 12. The small step gear 6 is to the right in the drawing, and is in contact with the first (fixed) ring gear 11. The module of the small step gear 6 is m=1.185 and the module of the large step gear 4 was selected with m=1.125. The tooth shapes are to be understood from the reproduction according to FIG. 6. The tooth flanks of the teeth of the small step wheel 6 give way above the pitch diameter in relation to the tooth flanks of the teeth of the large step gear 4, which is highlighted by the tooth shape drawn as the dotted line. The tip circle diameter of the small step wheel 6 is smaller. In the region of the tooth root or of the base circle, the width of the teeth of the small step wheel 6 compared to that of the large step wheel 4 is broader. Accordingly, the tooth flanks are drawn as continuous lines.

Special advantages for the rigidity of the transmission system also result here. The positions of the teeth of both toothed regions of the large and small step gear 4, 6, relative to each other, are identically selected. In the region of the axial gap 25, a transition zone originates in which both toothed regions can have common connecting cross sections.

Production of all of the tooth shapes poses no difficulties. The semi-finish cutting in a soft state is carried out absolutely alike for both toothed regions. This presupposes an adequately generously measured addition in the tooth thickness for final machining. The differently graduated flank shape of both toothed regions is subsequently produced in a hard state during the fine machining. A honing process is especially well suited for the fine machining.

Almost equally favorable efficiency in both directions of rotation—despite the influence resulting from the sense of direction of the helical-cut teeth—can be achieved when the planets 5 are disposed inclined spatially non-parallel in two directions. The step planets 5 (see FIG. 7) are, in one condition, radially slanted in relation to a transmission main axle 27 forming an acute angle α and, at another, additionally slantingly positioned in a peripheral direction forming an axle crossing angle β.

By virtue of the toothed regions of the step gears being separated from each other, it is possible to optimize the teeth separately from each other.

The above described embodiments of an almost play-free planetary gear, according to the invention, allow the production of large ratios. If the input engine is disposed offset relative to the transmission main axle, the sun gear 3 can be eliminated. The planet carrier 10 is then driven preferably, via a spur gear set, formed by teeth on the planet carrier 10 and an input pinion. Said input pinion is then eccentrically situated relative to the axle 27 of the planetary gear.

The off-center arrangement makes possible the accommodation of the input engine laterally of the transmission main axle and, depending on the existing volume ratios, is convenient for sparing axial length. Other volume ratios make it advantageous to drive the planet carrier over a bevel gear step so that the input engine can be placed radially relative to the planetary gear. In said driving possibilities, it is essential that the planet carrier be indirectly driven by the input engine via a preceding gear ratio.

| Reference Numerals | |
|---|---|
| 1 planetary gear | 14 annular housing |
| 2 input shaft | 15 spacer disc |
| 3 sun gear | 16 O-ring |
| 4 large step gear | 17 radial corrugated seal |
| 5 step planet | 18 crossing roller bearing |
| 6 small step gear | 19 ball bearing |
| 7 axle | 20 ball bearing |
| 8 bearing | 21 spacer disc |
| 9 bearing | 22 guarding |
| 10 planet carrier | 23 fixing bolt |
| 11 first ring gear | 24 spacer disc |
| 12 second ring gear | 25 axial gap |
| 13 output flange main axle | 26 step planet |
| | 27 transmission main axle |

We claim:

1. A planetary gear arrangement (1) comprising:
   a shaft driving a sun gear (3) with external teeth; and
   a first ring gear (11) with radially inwardly extending teeth and an adjacent second ring gear (12) with radially inwardly extending teeth;
   wherein said first ring gear (11) is fixedly mounted and said second ring gear (12) is rotatably mounted and forms an output of said planetary gear; and
   a plurality of planets (5, 26), with external teeth, are each supported by a planet carrier (10) upon a rotatable axle (7), and said external teeth of said plurality of planets (5) having a constant meshing engagement with said teeth of said sun gear (3) and said teeth of said first and second ring gears (11, 12), said plurality of planets (5, 26) are each step gears which have a small step gear (6) and a large step gear (4); and said small gear (6) and said large step gear (4) each have the same number of teeth and the same relative orientation of the teeth, but the teeth of the small step gear (6) having a different tooth module from the teeth of the large step gear (4) for all of said plurality of planets (5) forming said planetary gear arrangement.

2. The planetary gear arrangement according to claim 1, wherein said small step gear (6) and said large step gear (4) of said plurality of planets (5, 26) each support helical-cut external teeth which have a substantially similar pitch dimension and extend substantially in a similar axial direction.

3. The planetary gear arrangement according to claim 1, wherein said modules of said teeth of said small step gear (6) and said large step gear (4) are selected such that substantially equal pressure angles appear during operation of the planetary gear arrangement, when viewed in an axial direction, at a respective center of said first and second ring gears (11, 12).

4. The planetary gear arrangement according to claim 2, wherein said modules of said teeth of said small step gear (6) and said large step gear (4) are selected such that substantially equal pressure angles appear during operation of the planetary gear arrangement, when viewed in an axial direction, at a respective center of said first and second ring gears (11, 12).

5. The planetary gear arrangement according to claim 1, wherein the orientation of said teeth of said small step gear (6) and said teeth of said large step gear (4) are substantially identical.

6. The planetary gear arrangement according to claim 2, wherein the orientation of said teeth of said small step gear (6) and said teeth of said large step gear (4) are substantially identical.

7. The planetary gear arrangement according to claim 3, wherein the orientation of said teeth of said small step gear (6) and said teeth of said large step gear (4) are substantially identical.

8. The planetary gear arrangement according to claim 1, wherein each axle (7) which supports one of said plurality of planets (5, 26) is slantingly situated spatially and non-parallel in two directions.

9. The planetary gear arrangement according to claim 8, wherein each axle (7) which supports one of said plurality of planets (5, 26) is slantingly positioned in a peripheral direction forming an axle crossing angle $\beta$.

10. The planetary gear arrangement according to claim 1, wherein said teeth of said plurality of planets (5, 26) are honed.

11. A planetary gear arrangement (1) comprising:

a shaft driving a sun gear (3) with external teeth; and a first ring gear (11) with radially inwardly extending teeth and second ring gear (12) with radially inwardly extending teeth;

wherein said first ring gear (11) is fixedly mounted and said second ring gear (12) is rotatably mounted and forms an output of said planetary gear; and a plurality of planets (5, 26), with external teeth, are each supported by a planet carrier (10) upon a rotatable axle (7), each said axle (7) is supported on said planet carrier (10) by a pair of bearings to facilitate rotation thereof, said external teeth of said plurality of planets (5) have a constant meshing engagement with said teeth of said sun gear (3) and said teeth of said first and second ring gears (11, 12), said plurality of planets (5, 26) are each step gears which have a small step gear (6) and a large step gear (4); and said small and said large step gears (4, 6) each have the same number of teeth and the same relative orientation of the teeth, but the teeth of the small step gear (6) have a different tooth module from the teeth of the large step gear (4) for all of said plurality of planets (5) of said planetary gear arrangement, and said small and said large step gears (4, 6) are offset from one another by an axial gap (25).

12. The planetary gear arrangement according to claim 11, wherein a spacer disc (15) is located between said first ring gear (11) and said second ring gear (12).

13. The planetary gear arrangement according to claim 11, wherein a seal is provided between said first ring gear (11) and said second ring gear (12).

14. A planetary gear arrangement (1) comprising:

a shaft driving a sun gear (3) with external teeth; and a first ring gear (11) with radially inwardly extending teeth and an adjacent second ring gear (12) with radially inwardly extending teeth;

wherein said first ring gear (11) is fixedly mounted and said second ring gear (12) is rotatably mounted and forms an output of said planetary gear; and a plurality of planets (5, 26), with external teeth, are each supported by a planet carrier (10) upon a rotatable axle (7), and said external teeth of said plurality of planets (5) have a constant meshing engagement with said teeth of said sun gear (3) and said teeth of said first and second ring gears (11, 12), said plurality of planets (5, 26) are each step gears which have a small step gear (6) and a large step gear (4); and said small step gear (6) and said large step gear (4) each having the same number of teeth but the teeth of the small step gear (6) having a different tooth module from the teeth of the large step gear (4); and said planet carrier (10) is driven via a spur gear set with an input shaft offset in parallel relative to a main axle of a transmission accommodating said planetary gear arrangement.

* * * * *